United States Patent [19]

Tahmasebi et al.

[11] Patent Number: 5,279,176
[45] Date of Patent: Jan. 18, 1994

[54] SIX-DEGREE-OF-FREEDOM PARALLEL "MINIMANIPULATOR" WITH THREE INEXTENSIBLE LIMBS

[75] Inventors: Farhad Tahmasebi, Burtonsville; Lung-Wen Tsai, Potomac, both of Md.

[73] Assignee: The United States of America as represented by the Administrator of the National Aeronautics and Space Administration, Washington, D.C.

[21] Appl. No.: 915,567

[22] Filed: Jul. 20, 1992

[51] Int. Cl.$^5$ .......................... G05G 11/00; B25J 11/00
[52] U.S. Cl. .............................. 74/479 B; 74/479 PF; 901/14; 901/19
[58] Field of Search .......................... 74/469, 471 XY, 479 R, 479 B, 479 BW, 479 PF, 479 PH, 479 MF; 901/14, 901/15, 16, 17, 18, 19, 27

[56] References Cited

U.S. PATENT DOCUMENTS

| | | | |
|---|---|---|---|
| 4,132,318 | 1/1979 | Wang et al. | 214/1 BB |
| 4,437,635 | 3/1984 | Pham | 248/122 |
| 4,522,555 | 6/1985 | Inoue et al. | 414/733 |
| 4,651,589 | 3/1987 | Lambert | 74/469 |
| 4,762,016 | 8/1988 | Stoughton et al. | 74/479 |
| 4,811,608 | 3/1989 | Hilton | 74/471 XY X |
| 4,828,453 | 5/1989 | Martin et al. | 414/738 |
| 4,975,856 | 12/1990 | Vold et al. | 364/513 |
| 4,976,582 | 12/1990 | Clavel | 74/479 B X |

FOREIGN PATENT DOCUMENTS

| | | | |
|---|---|---|---|
| 2015276 | 10/1970 | Fed. Rep. of Germany | 74/469 |
| 1239864 | 7/1971 | United Kingdom | 74/471 XY |

OTHER PUBLICATIONS

"Design and Analysis of a New Six-Degree-of-Freedom Parallel Minimaipulator", Aug. 20, 1991, Lung-Wen Tsai and Farhad Tahmasebi, pp. 568-575.

Primary Examiner—Leslie A. Braun
Assistant Examiner—David W. Laub
Attorney, Agent, or Firm—Paul S. Clohan, Jr.; R. Dennis Marchant; Guy M. Miller

[57] ABSTRACT

A Six-Degree-of-Freedom Parallel-Manipulator having three inextensible limbs for manipulating a platform is described in which the three inextensible limbs are attached via universal joints to the platform at non-collinear points. Each of the inextensible limbs is also attached via universal joints to a two-degree-of-freedom parallel driver such as a five-bar lineage, a pantograph, or a bidirectional linear stepper motor. The drivers move the lower ends of the limbs parallel to a fixed base and thereby provide manipulation of the platform. The actuators are mounted on the fixed base without using any power transmission devices such as gears or belts.

11 Claims, 7 Drawing Sheets

SIX-DEGREE-OF-FREEDOM PARALLEL "MINIMANIPULATOR" WITH THREE INEXTENSIBLE LIMBS

ORIGIN OF THE INVENTION

The invention described herein was jointly made by an employee of the United States Government and a non-employee of the United States Government. This invention may be manufactured and used by or for the Government for governmental purposes without the payment of any royalties thereon or therefor.

TECHNICAL FIELD

This invention relates to manipulators in general and in particular to a "minimanipulator" designed to provide high resolution and high stiffness for fine position and force control in a hybrid serial-parallel manipulator system.

BACKGROUND ART

Flight simulators such as the Stewart platform (Stewart, D. 1965, "A Platform with Six Degrees of Freedom," *Proc. Institute of Mechanical Engr.*, London, England, Vol. 180, pp. 371–386) have been used and studied as parallel manipulators. Kohli et al. (Kohli, D., Lee, S. H., Tsai, K. Y., and Sandor, G. N., 1988, "Manipulator Configurations Based on Rotary-Linear (R-L) Actuators and Their Direct and Inverse Kinematics," *Trans. ASME, J. of Mech., Transmis., and Auto. in Design*, Vol. 110, pp. 397–404) studied six-degree-of-freedom (six-DOF) parallel manipulators which are driven by base-mounted Rotary-Linear actuators. Hudgens and Tesar (Hudgens, J. C., and Tesar, D., 1988, "A Fully-Parallel Six Degree-of-Freedom Micromanipulator: Kinematic Analysis and Dynamic Model," *Trends and Developments in Mechanisms, Machines, and Robotics—Proc. of the 20th Biennial Mechanisms Conference*, ASME, New York, DE—Vol. 15-3, pp. 29–37) introduced a new six-DOF parallel micromanipulator suitable for serial-parallel systems. Pierrot et al. (Pierrot, F., Fournier, A., and Dauchez, P., 1991, "Towards a Fully-Parallel 6 DOF Robot for High-Speed Applications," *Proc. of the 1991 IEEE International Conference on Robotics and Automation*, pp. 1288–1293) introduced a high-speed six-DOF parallel manipulator.

DISADVANTAGES OF PRIOR ART

Most of the six-DOF parallel manipulators which have been proposed in the past contain six limbs. The Stewart platform, the manipulator introduced by Hudgens and Tesar, and the mechanism studied by Pierrot et al. all contain six limbs. Compared to a three-limbed parallel mechanism, such as the present invention,
1. Their direct kinematics analyses are very complicated.
2. There is a higher possibility of mechanical interference between their limbs.
3. More parts are needed in their construction.

Note that the only six-limbed, six-DOF parallel manipulators for which closed-form direct kinematics solution has been reported in the literature are special forms of the Stewart platform (Nanua, P., Waldron, K. J., and Murthy, V., 1990, "Direct Kinematic Solution of a Stewart Platform," *IEEE Transactions on Robotics and Automation*, Vol. 6, pp. 438–444; Griffis, M., and Duffy, J., 1989, "A Forward Displacement Analysis of a Class of Stewart Platforms," *J. of Robotic Systems*, Vol. 6, pp. 703–720; Innocenti, C., and Parenti-Castelli, V., 1990, "Direct Position Analysis of the Stewart Platform Mechanism," *Mechanism and Machine Theory*, Vol. 25, pp. 611–612). In these special forms, pairs of spherical joints are concentric on either the platform or both the base and the platform. However, as mentioned by Griffs and Duffy, pairs of concentric spherical joints may very well present design problems.

In a Stewart platform, if the prismatic joints are actuated by electric power, then the actuators are not fixed. As a result, the weight of each actuator is a load for the other actuators. As a result
1. Payload capacity is reduced.
2. Actuator sizes are increased.
3. More power is dissipated.

The limbs in the Stewart platform and the mechanisms introduced by Kohli et al. and Pierrot et al. are extensible (each limb contains a revolute or a prismatic joint). As a result, their resolutions, accuracies and stiffness properties are worse than those of the present invention.

ADVANTAGES OF THE PRESENT INVENTION OVER THE PRIOR ART

Compared to the prior art six-limbed, six-DOF parallel manipulators (Stewart; Hudgens and Tesar; Pierrot et al., etc.), a "minimanipulator" has the following advantages:
1. Closed-form solution can be obtained for its direct kinematics (Tahmasebi, F., and Tsai, L. W., 1992, "Closed-Form Direct Kinematics Solution of a New Parallel Minimanipulator," *Accepted for presentation at the 1992 Japan-U.S.A. Symposium on Flexible Automation*).
2. There is a lower possibility of mechanical interference between its limbs
3. Fewer number of parts are needed in its construction.

Compared to the prior art six-DOF parallel mechanisms with moving actuators, a "minimanipulator" has the following advantages:
1. Its payload capacity can be made higher.
2. Its actuators can be made smaller.
3. It dissipates less power.

Inextensible limbs and two-DOF drivers of a "minimanipulator" increase its positional resolution and stiffness (Tahmasebi, F., and Tsai, L. W., 1992, "Jacobian and Stiffness Analysis of a Novel Class of Six-DOF Parallel Minimanipulators," *Accepted for presentation at the 22nd ASME Biennial Mechanisms Conference*).

STATEMENT OF THE INVENTION

It is therefore an object of the present invention to provide a six-DOF parallel manipulator that has superior resolution, accuracy, and stiffness as compared to the prior art.

Another object of the present invention is to mount all of its actuators on its fixed base without using any power transmission devices (e.g., gears, belts).

A further object of the present invention is to use the minimum possible number of limbs in its synthesis.

A still further objective of the present invention is to have symmetry between its limbs.

These and other objects are achieved by providing a Six-DOF Parallel "Minimanipulator" with three inextensible limbs. The term "minimanipulator" is used because this mechanism is not designed to provide very large platform displacements. To provide high resolution, accuracy, and stiffness, the present invention is designed to have inextensible limbs. The Lower end of each limb is connected to a two-DOF driver (e.g., a bidirectional linear stepper motor, an X-Y position table, a pantograph or a five-bar linkage) and can be moved freely on the base plate. The desired "minimanipulator" motion is obtained when the drivers move the lower ends of its three limbs on its base plate. Pantograph or five-bar linkage drivers further improve resolution, accuracy, and stiffness of the present invention.

DETAILED DESCRIPTION OF THE INVENTION

Figure 1:
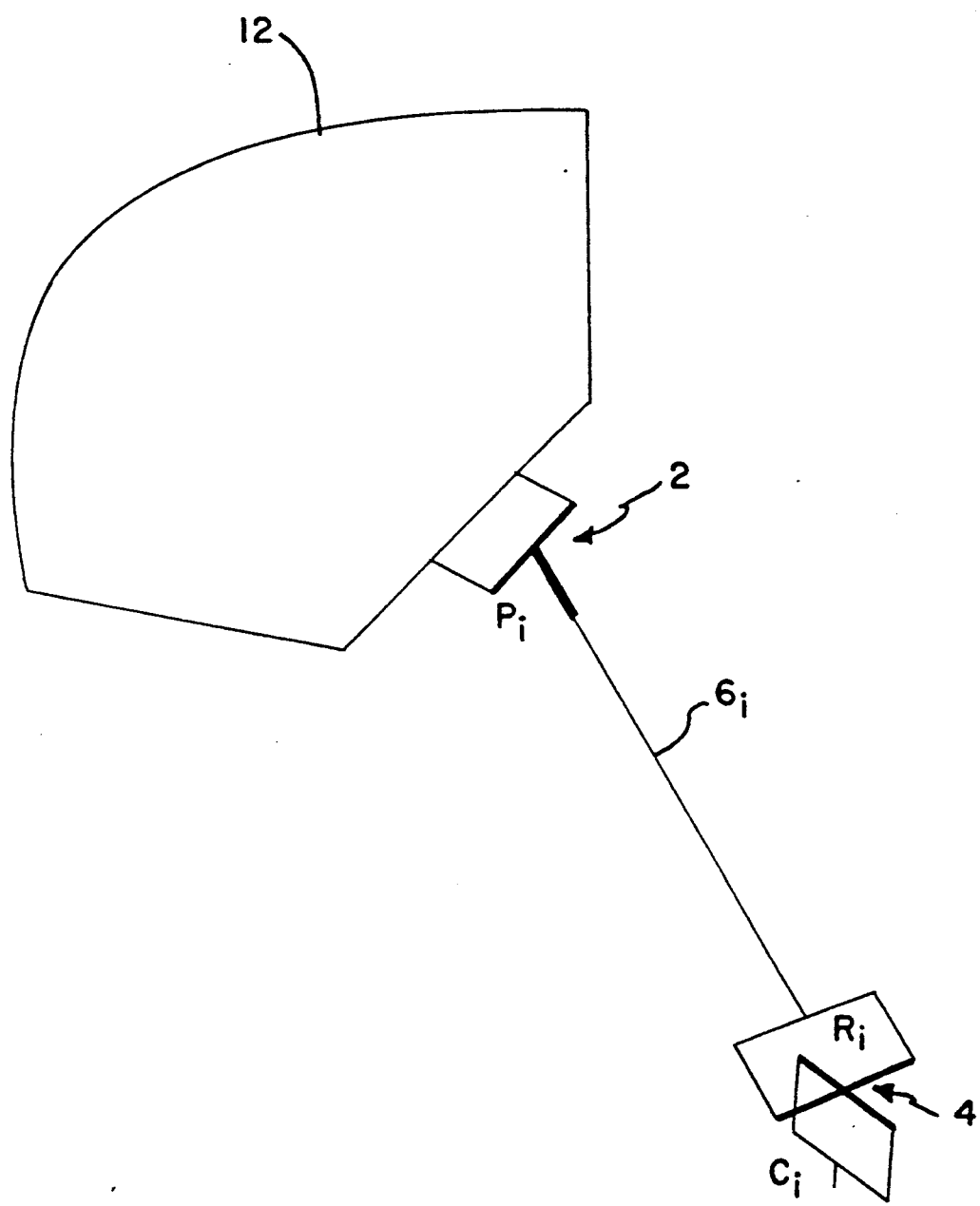
FIG. 1 is a representation of an inextensible limb connected to a platform and a base.

As mentioned above in the section entitled Disadvantages of Prior Art, many of the prior art six-DOF parallel mechanisms described in the literature contain six limbs. Reducing the number of limbs in a parallel mechanism lowers the number of loops in its structure. As a result, direct kinematics of the mechanism is simplified whereas its inverse kinematics becomes more challenging. Since direct kinematics of a parallel manipulator is much more difficult than its inverse kinematics, the present invention, a Three-Limbed Six-Degree-of-Freedom Parallel "Minimanipulator" is designed to contain a minimum number of limbs. Minimizing the number of limbs results in numerous benefits, namely: lower number of links and joints, lower "minimanipulator" weight, and higher dexterity. Three non-collinear points on a platform of a six-DOF parallel manipulator will completely define its location (position and orientation) in space. Therefore, each "minimanipulator" contains three limbs which connect three non-collinear points on its platform to its base.

For the reasons mentioned in the section entitled Disadvantages of Prior Art, the present invention is designed to have base-mounted actuators and inextensible limbs. The actuators are mounted on the base without using any power transmission devices such as belts or gear trains. Due to friction and backlash, power transmission devices introduce low stiffness and accuracy problems. In addition, the limbs are also symmetric (a symmetric six-DOF parallel manipulator is defined as having identical joints and links in each limb connecting its base to its platform). Symmetry is needed for an even load distribution. The Lower end of each limb is connected to a two-DOF driver (e.g., a bidirectional linear stepper motor, an X-Y position table, a pantograph or a five-bar linkage) and can be moved freely on the base plate. The desired "minimanipulator" motion is obtained when the drivers move the lower ends of its three limbs parallel to its base plate. Each limb of the symmetric six-DOF parallel "minimanipulator" must have six degrees of freedom in its joints; the proof of this is as follows:

| Symbol | Description |
|--------|-------------|
| $f_k$  | degrees of freedom of joint k |
| F      | degrees of freedom of a parallel manipulator |
| j      | number of joints in each limb |
| J      | total number of joints in a parallel manipulator |
| k      | index |
| m      | number of limbs in a parallel manipulator |
| n      | number of links in each limb |
| N      | total number of links in a parallel manipulator |
| λ      | integer, 3 for planar & spherical mechanisms, 6 for spatial mechanisms |
| σ      | total degrees of freedom in joints of each limb |

Each limb is an open kinematic chain which connects the base to the platform. Let j include the top and bottom joints which connect a limb to the platform and the base. Then $$j = n + 1$$

Total number of links and joints in a parallel manipulator are related to number of links and joints in each limb by the following relationships:

$$N = mn + 2$$

$$J = mj$$

Number of DOF of a mechanism can be obtained from the following mobility equation:

$$F = \lambda(N - J - 1) + \sum_{k=1}^{j} f_k$$

For a six-DOF symmetric parallel manipulator, F=6, λ=6, and $$\sum_{k=1}^{j} f_k = m\sigma$$

Therefore, the mobility equation reduces to:

$$6 = 6[mn + 2 - m(n+1) - 1] + m\sigma$$

After simplification, the intended result is obtained. That is:

$$\sigma = 6$$

Figure 2:
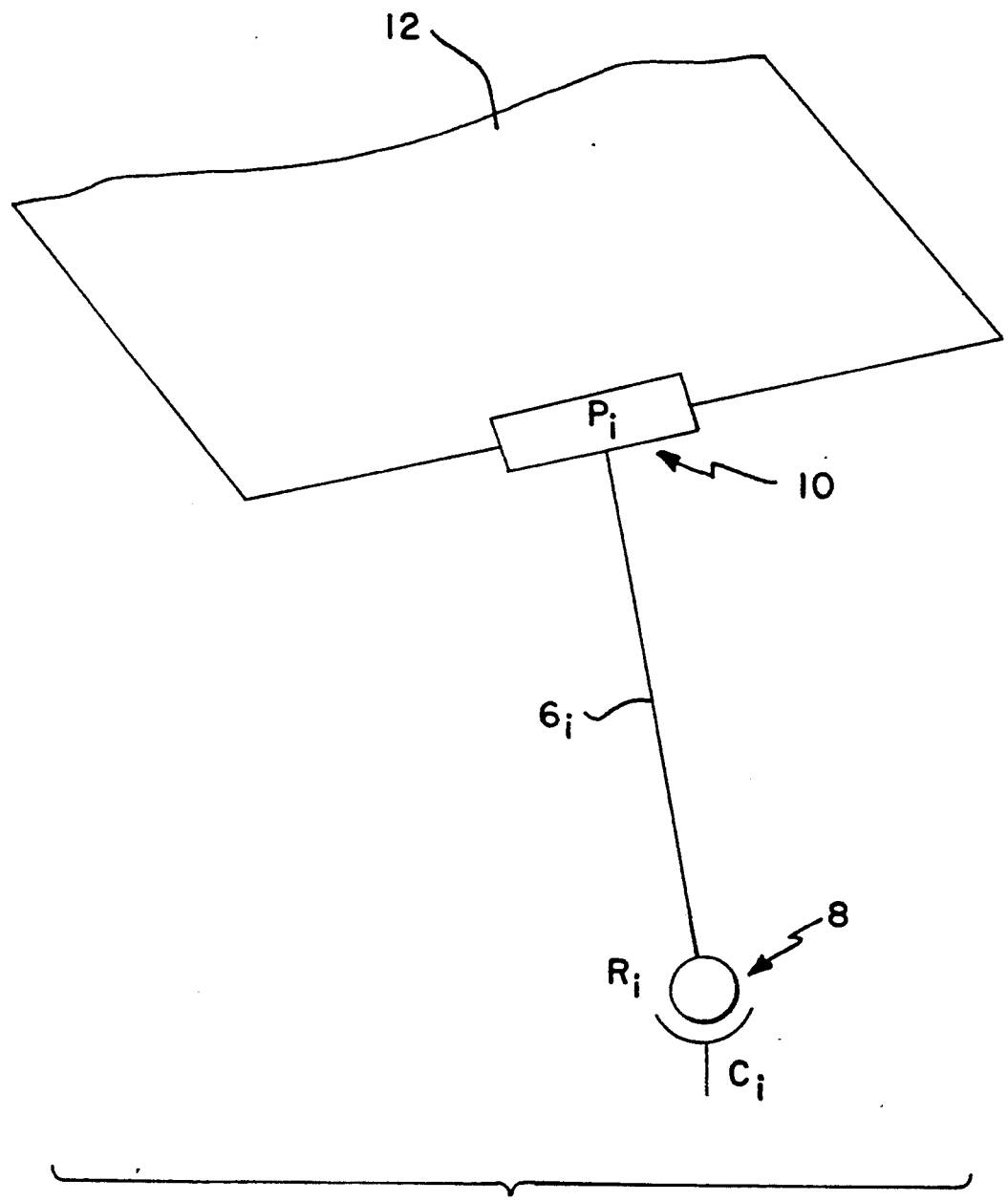
FIG. 2 is a kinematic equivalent of the limb represented by FIG. 1.

Therefore, in addition to the two-DOF provided by a driver, each limb should be given four more DOF. To keep the limbs inextensible, joints are placed only at their lower and upper ends. A three-DOF spherical joint at one end and a revolute joint at the other end can be used. However due to difficulties in their fabrication, spherical joints are not very precise. Hence, they are not recommended for the "minimanipulators". Instead, a two-DOF universal joint is placed at each end of a limb, as shown in FIG. 1. One of the axes of upper universal joint 2 is collinear with limb $6_i$ (subscript i represents numbers 1, 2, and 3 in a cyclic manner); while the other axis of upper universal joint 2, as well as one of the axes of lower universal joint 4, are always perpendicular to limb $6_i$. The platform is shown as item 12. This arrangement is kinematically equivalent to a limb with a spherical joint 8 at its lower end and a revolute joint 10 at its upper end, as shown in FIG. 2. Note that by using the limb configuration shown in FIG. 1, the kinematics of the "minimanipulator" is made independent of the output link orientations of its two-DOF drivers. Due to simplicity of its representation, the equivalent limb configuration shown in FIG. 2 has been used in kinematics analysis of the "minimanipulators".

Figure 3:
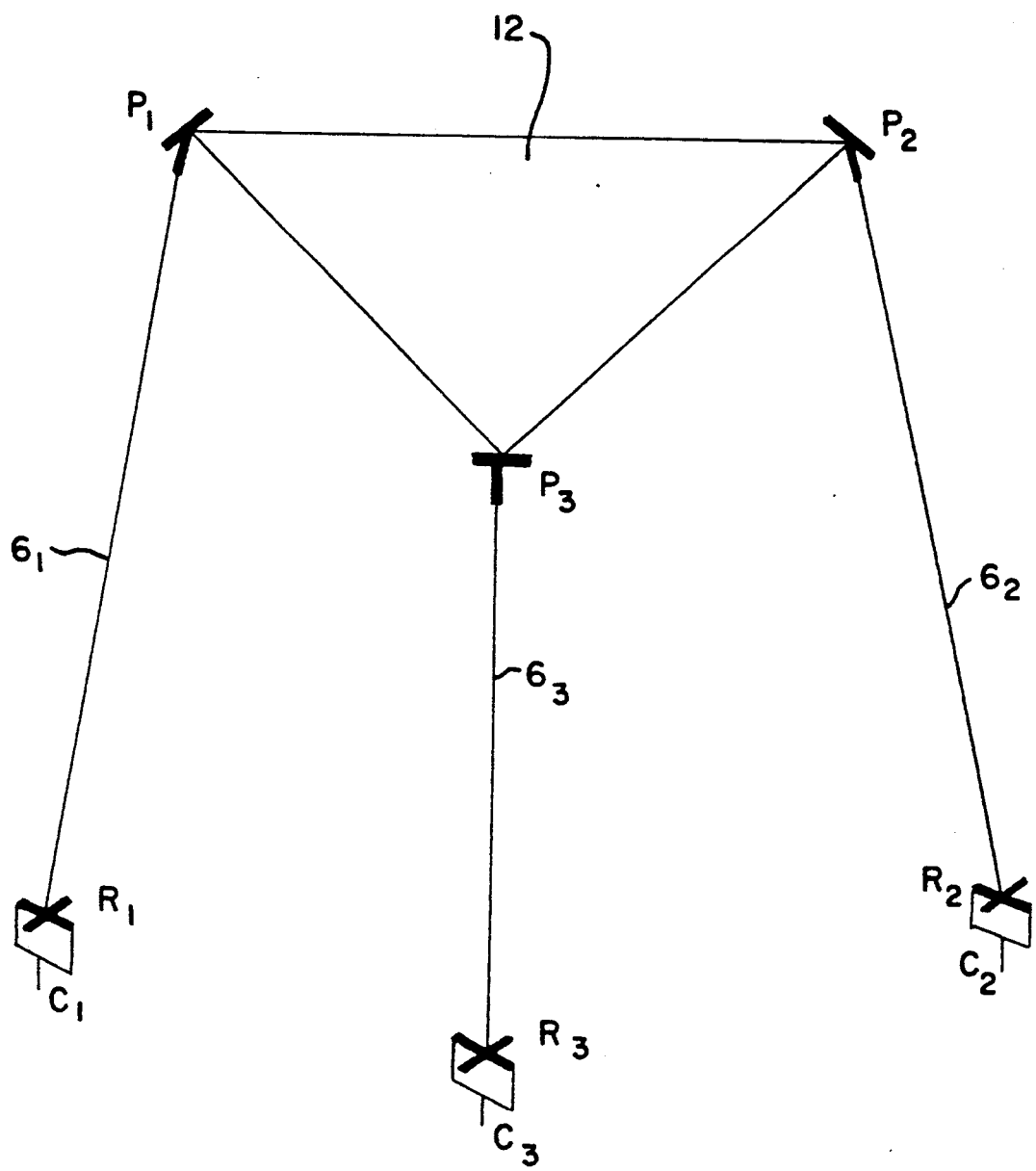
FIG. 3 is a representation of a "minimanipulator".

A representation of a complete "minimanipulator" is shown in FIG. 3. Points $R_1$, $R_2$ and $R_3$ are connected to two-DOF drivers (described later) and can be moved on a base plate (to be shown later). Points $P_1$, $P_2$ and $P_3$ are on platform 12. To keep the "minimanipulator" geometrically symmetric, axes of the topmost revolute joints at points $P_1$, $P_2$ and $P_3$ are made parallel to lines $P_2P_3$, $P_3P_1$, and $P_1P_2$ respectively.

Two-DOF planar mechanisms (e.g., bidirectional linear stepper motors, X-Y position tables, pantographs and five-bar linkages) are used at points $R_1$, $R_2$, $R_3$ as drivers. Pantographs and five bar linkages are capable of increasing the mechanical advantage of the "minimanipulator". As a result, better positional resolution and stiffness can be obtained.

PANTOGRAPHS AS TWO-DOF DRIVERS

Figure 4:
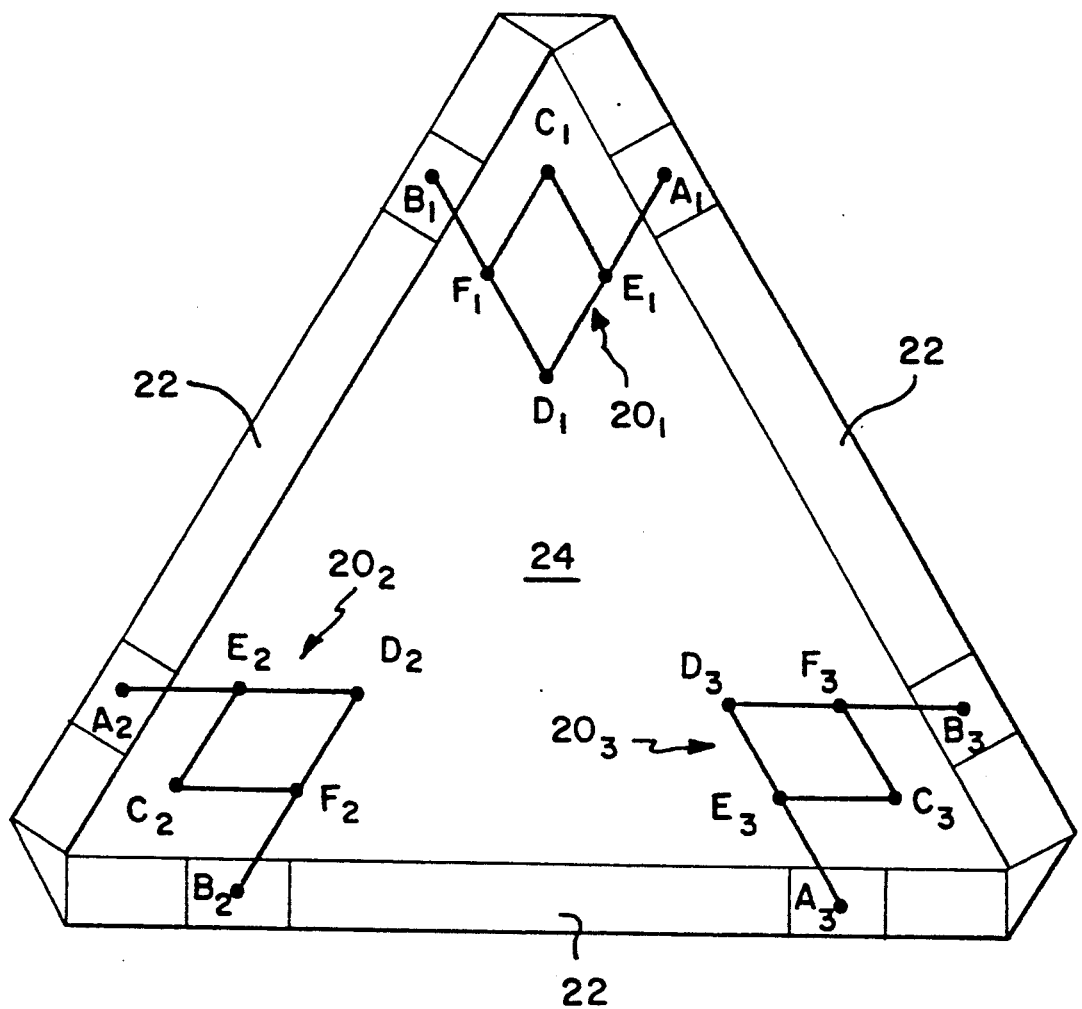
FIG. 4 represents pantographs as two-DOF drivers for the "minimanipulator" of FIG. 3.

Pantographs are often used for magnifying displacement and speed (e.g., Song, S. M., Waldron, K. J., and Kinzel, G. L., 1985, "Computer-Aided Geometric Design of Legs for a Walking Vehicle," *Mechanism and Machine Theory*, Vol. 20, pp. 587-596). In the present invention, they are used as speed-reduction devices. FIG. 4 shows a completely symmetrical arrangement of three simple pantographs $20_1$, $20_2$, and $20_3$, mounted on base 24, which can be used to drive the six-DOF parallel "minimanipulator". Points $C_1$, $C_2$, and $C_3$ are the output points of the pantographs $20_1$, $20_2$, and $20_3$ and are connected to limbs $6_1$, $6_2$, and $6_3$ (see FIG. 3). The desired platform 12 motion is obtained by driving sliders $A_1$, $A_2$, $A_3$ and $B_1$, $B_2$, $B_3$ inside guides 22.

Motion can be illustrated as follows: subscript i represents numbers 1, 2, and 3 in a cyclic manner. There are revolute joints at points $A_i$, $B_i$, $C_i$, $D_i$, $E_i$ and $F_i$. Prismatic joints connect sliders $A_i$ and $B_i$ to guides 22. Point $C_i$ always lies on line $A_iB_i$. If slider $B_i$ is fixed and slider $A_i$ is moving, a similar path is followed by the output point $C_i$ with a reduction factor of $R_{a,i}$. Likewise, if slider $A_i$ is fixed and slider $B_i$ is moving, a similar path is followed by the output point $C_i$ with a reduction factor of $R_{b,i}$. These reduction factors are equal to the following ratios:

$$R_{a,i} = \frac{B_iC_i}{B_iA_i} = \frac{B_iF_i}{B_iD_i} = \frac{D_iE_i}{D_iA_i}$$

$$R_{b,i} = \frac{A_iC_i}{A_iB_i} = \frac{A_iE_i}{A_iD_i} = \frac{D_iF_i}{D_iB_i}$$

The above results are based on derivations presented by Song et al.(1985). When both sliders $A_i$ and $B_i$ are moving, the resultant displacement of the output point $C_i$ is the vector sum of the displacements described above. Such displacement reductions are equivalent to reduction in speed or increase in mechanical advantage. As a result, stiffness and positional resolution of the "minimanipulator" is improved.

Motions generated at the output point $C_i$ by sliders $A_i$ and $B_i$ are decoupled. As mentioned by Song et al. (1985) the decoupling feature of pantographs provides simpler coordination control and better energy efficiency. However, the above equations for the reduction factors show that:

$$R_{a,i} + R_{b,i} = 1$$

Such reduction factors may not be good enough for applications which require very high resolution and stiffness. Therefore, five-bar linkages are also available for speed reduction in the "minimanipulators" and will be discussed in the next section.

Skew pantographs are not advisable because, in an arrangement similar to the one described above, they do not reduce speeds as well as simple pantographs do (sum of the speed reduction factors for a skew pantograph is greater than one). In addition, in a skew pantograph, the path of the output point is rotated with respect to the slider paths. Such rotations complicate the calculations needed for control of a "minimanipulator".

FIVE-BAR LINKAGES AS TWO-DOF DRIVERS

Five-bar linkages have been used by Asada and Ro (Asada, H., and Ro, I. H., 1985, "A Linkage Design for Direct-Drive Arms,", *Trans. ASME, J. of Mech., Transmis., and Auto. in Design*, Vol. 107, pp. 536-540) to improve force and speed characteristics of two-DOF direct-drive robot arms. Bajpai and Roth (Bajpai, A., and Roth, B., 1986, "Workspace and Mobility of a Closed-Loop Manipulator," *The International J. of Robotics Research*, Vol. 5, pp. 131-142) have studied workspace and mobility of manipulators with structures based on five-bar linkages. In the present invention, two five-bar linkage configurations are shown which are suitable for improving resolution and stiffness of the "minimanipulators".

Figure 5:
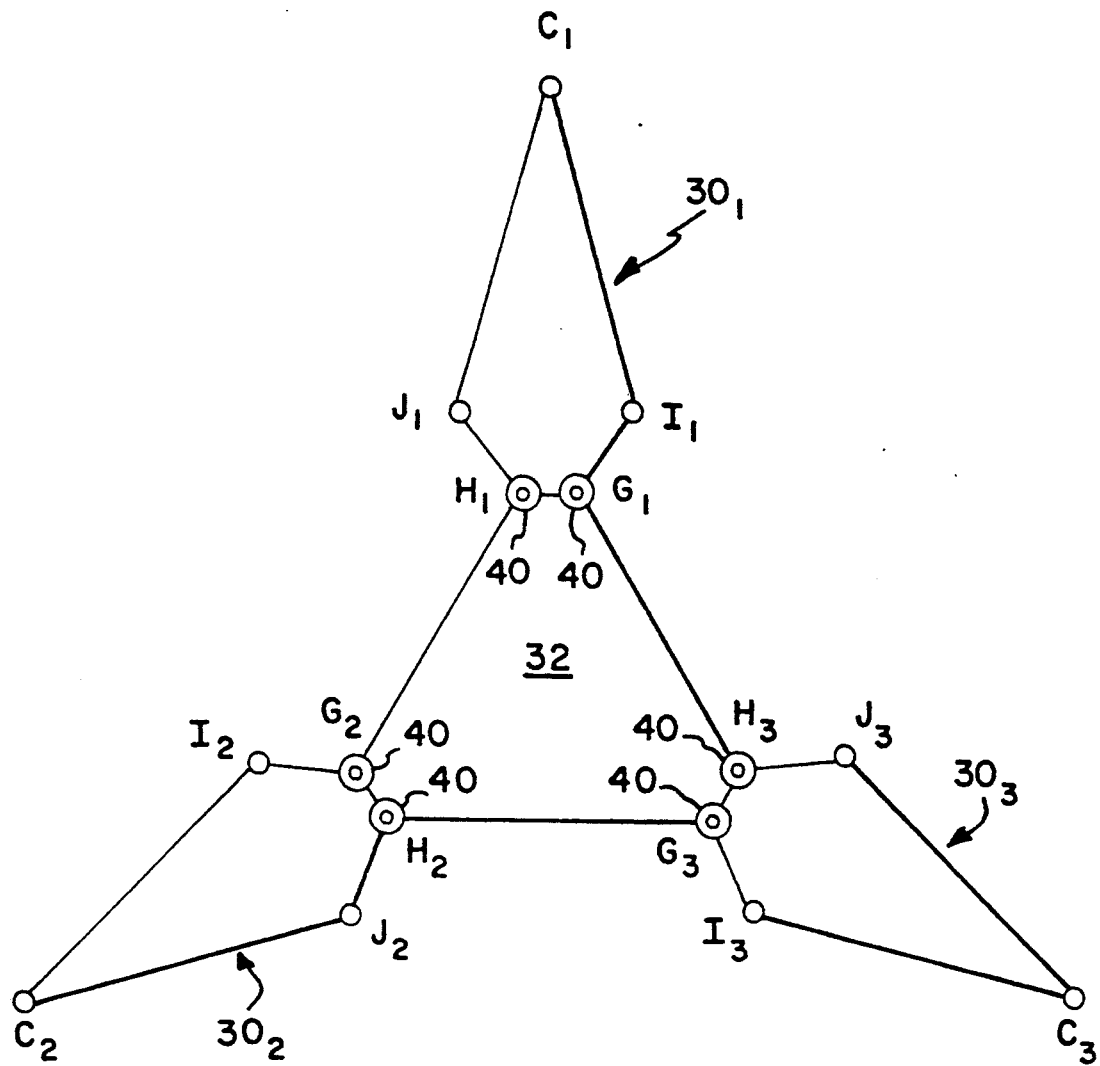
FIG. 5 represents five-bar linkages as two-DOF drivers for the "minimanipulator" of FIG. 3.

FIG. 5 shows three identical five-bar linkages $30_1$, $30_2$ and $30_3$ mounted on base 32 which can be used to drive the "minimanipulator". Points $C_1$, $C_2$ and $C_3$ are the output points of the five-bar linkages (see FIG. 1). Base-mounted rotary actuators 40 are placed at points $G_1$, $G_2$, $G_3$ and $H_1$, $H_2$, $H_3$. Asada and Ro (1985) showed that the larger the speed reduction at the output point of a five-bar linkage, the smaller the workspace which can be generated. They also illustrated that the smaller the input link lengths $H_iJ_i$ and $G_iI_i$ with respect to the other link lengths $J_iC_i$ and $I_iG_i$, the higher the speed reduction at the output point $C_i$. The lower end of a manipulator limb is not required to move over a large area on a base plate. Hence, the five-bar linkages are designed to provide large speed reductions at their output points (i.e., their input links are made much smaller than their other links).

SIMPLIFIED FIVE-BAR LINKAGES AS TWO-DOF DRIVERS

Figure 6:
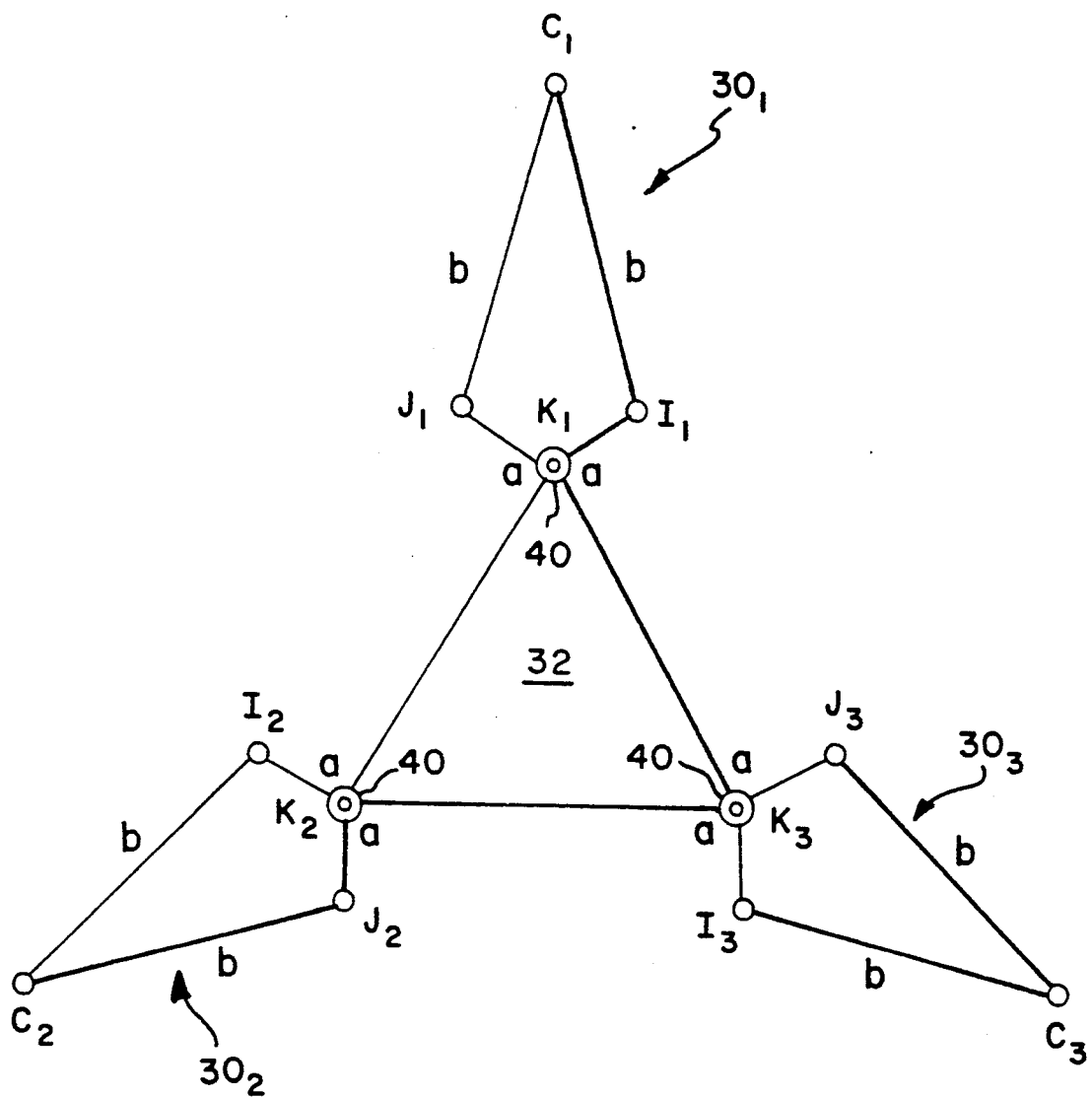
FIG. 6 is a simplified version of the five-bar linkage driver of FIG. 5.

The driving five-bar linkages can be simplified by making the axes of rotary actuators $G_i$ and $H_i$ (see FIG. 5) coincide, as shown in FIG. 6. At points $K_1$, $K_2$, $K_3$, there is an actuator 40 on each side of base 32 to drive links $K_iJ_i$ and $K_iI_i$. The simplified five-bar drivers which are considered here are completely symmetric. That is:

*$K_iJ_i$ and $K_iI_i$;*
*$J_iC_i$ and $I_iC_i$*

As a result, coordination between actuator rotations can be easily accomplished. Namely, angular displacement of an output point C is obtained by equal actuator rotations, and its radial displacement is obtained by equal and opposite actuator rotations.

OTHER TWO-DOF DRIVERS

Figure 7:
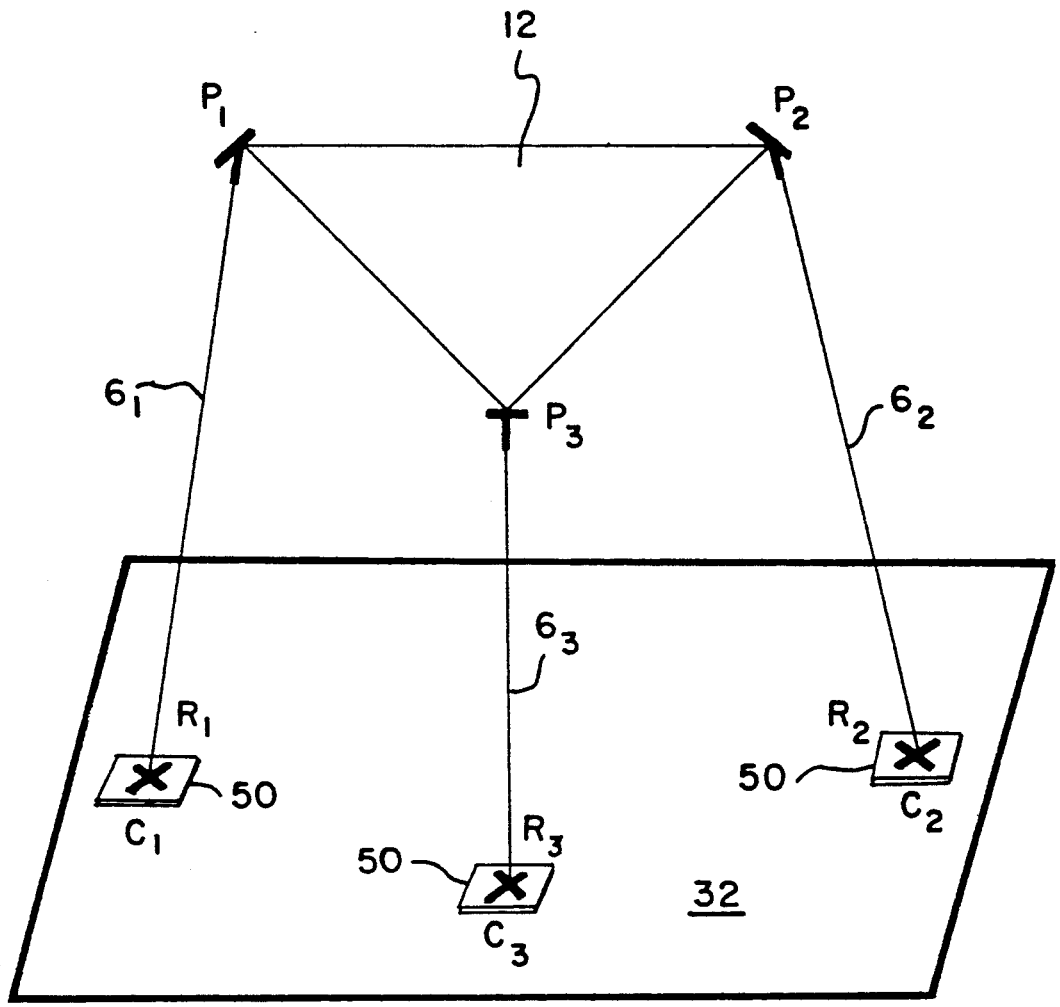
FIG. 7 shows the minimanipulator driven by bidirectional linear stepper motors of X-Y position tables mounted to the base member.

Bidirectional linear stepper motors (Yeaple, F., 1988, "Choreographed Robots Insert Automotive Parts," *Design News*, Vol. 44, No. 21, pp. 134–135) or X-Y positioning tables can also be used to move the lower end of limb 6 on base 32. See FIG. 7 where the bidirectional linear stepper motors and the X-Y positioning tables are shown as elements 50. However, such devices do not provide any increase in mechanical advantage of the "minimanipulator". Note that a bidirectional linear stepper motor acts as a X-Y positioning table, but its stators are base-mounted.

RECOMMENDED DRIVERS

A five-bar linkage, like that shown in FIG. 5, has fewer links than a pantograph. In addition, all of the joints in a five-bar linkage are revolute which can be designed and maintained easier than prismatic joints. As mentioned earlier, a five-bar linkage can be designed to provide a higher speed reduction than a pantograph. On the other hand, the decoupling feature of a pantograph results in better coordination control and energy efficiency. However, the simplified Five-Bar configuration shown in FIG. 6 can also provide simple coordination control. Hence, it may be more suitable than those configurations shown in FIGS. 4 and 5 for many applications.

ALTERNATIVE EMBODIMENTS OF THE INVENTION

The two-DOF drivers can be designed to obtain larger workspace with reduced resolution and stiffness. For example, if simplified five-bar drivers are used (see FIG. 6), the workspace can be maximized by making $K_i I_i$ equal to $I_i C_i$ and $K_i J_i$ equal to $J_i C_i$. A parallel mechanism with the same structure as the "minimanipulator" and with a larger workspace can be used as a motion simulator. In addition, a "minimanipulator" can be used as a passive compliant device or a force/torque sensor, if its actuators are replaced by rotational displacement transducers.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A six-degree-of-freedom parallel manipulator comprising:
   three inextensible limbs each having a first end and a second end;
   each of said inextensible limbs moveably attached at said first end to a platform at non-collinear points on said platform; and
   planar driver means affixed to a base member and moveably attached to each said second end of said inextensible limbs for providing planar movement to each said second end of each said inextensible limb thereby providing manipulation of said platform.

2. The device of claim 1 wherein each of said inextensible limbs are moveably attached at each end with joints such that each limb is provided with six degrees of freedom.

3. The device of claim 2 wherein each said limb has a three-degree-of-freedom spherical joint at said second end and a revolute joint at said first end.

4. The device of claim 2 wherein each said limb has a two-degree-of-freedom universal joint at each end.

5. The device of claim 4 wherein one of the axes of the universal joint at said first end is collinear with its limb, and the other axes of the universal joint at said first end as well as one axes of the universal joint at said second end are perpendicular to its limb.

6. The device of claim 1 wherein said planar driver means for providing planar movement comprises three two-degree-of-freedom drivers.

7. The device of claim 6 wherein said three two-degree-of-freedom drivers each comprise a pantograph mounted to said base member.

8. The device of claim 6 wherein said three two-degree-of-freedom drivers each comprise a five bar linkage mounted to said base member.

9. The device of claim 7 wherein each said pantograph is arranged as a speed reduction pantograph.

10. The device of claim 6 wherein said three two-degree-of-freedom drivers each comprise a bidirectional linear stepper motor mounted to said base member.

11. The device of claim 6 wherein said three two-degree-of-freedom drivers each comprise X-Y position tables mounted to said base member.

* * * * *